United States Patent [19]

Grundy et al.

[11] Patent Number: 4,501,525

[45] Date of Patent: Feb. 26, 1985

[54] SINGLE POINT MOORING SYSTEM PROVIDED WITH PRESSURE RELIEF MEANS

[75] Inventors: Andrew K. Grundy; Jan Versluis, both of The Hague, Netherlands

[73] Assignee: Shell Oil Company, Houston, Tex.

[21] Appl. No.: 473,388

[22] Filed: Mar. 8, 1983

[30] Foreign Application Priority Data

Mar. 17, 1982 [GB] United Kingdom ................ 8207830

[51] Int. Cl.[3] ............................................. B65G 67/60

[52] U.S. Cl. ................................... 414/139; 114/230; 137/68 R; 137/236 S; 137/312; 141/387; 441/5

[58] Field of Search ............ 114/230; 137/68 R, 535, 137/85, 312, 89, 236 S; 141/94, 192, 193, 279, 387, 388; 441/3, 4, 5; 414/138, 139

[56] References Cited

U.S. PATENT DOCUMENTS

| | | | |
|---|---|---|---|
| 2,549,674 | 4/1951 | Denham | 141/192 |
| 2,701,075 | 2/1955 | Coffman | 137/68 R |
| 3,414,918 | 12/1968 | Petrie et al. | 441/5 |
| 3,943,983 | 3/1976 | Gelfand | 141/192 |
| 3,956,742 | 5/1976 | Karl | 114/230 |
| 4,107,803 | 8/1978 | Sylverst | 441/4 |
| 4,257,146 | 3/1981 | Karp | 141/192 |

*Primary Examiner*—Joseph E. Valenza
*Assistant Examiner*—Lyle Kim

[57] ABSTRACT

The invention relates to a single point mooring system provided with pressure relief means. Single point mooring systems are used for offshore loading and unloading of oil tankers, wherein a tanker may be moored at its bow to a rotatable mooring element of the system, thus allowing the tanker to rotate about the system in response to forces caused by the tides, winds and currents.

10 Claims, 3 Drawing Figures

SINGLE POINT MOORING SYSTEM PROVIDED WITH PRESSURE RELIEF MEANS

BACKGROUND OF THE INVENTION

Various kinds of single point mooring systems are known, for example from U.S. patent specification Nos. 3,187,355; 3,515,182; 3,908,212 and 3,913,157.

The loading and unloading operation of a ship moored to a single point mooring system is carried out by means of liquid transfer through a flow line extending between liquid supply facilities and the ship. In order to allow movements of the moored ship during these operations, the flow line section extending between the single point mooring system and the ship usually consists of a comparatively fragile flexible conduit.

Although the process of liquid transfer through single point mooring system has been developed to a high level of reliability, it incidentally may happen that damage is inflicted to the flow line because of the occurrence of an excessively high liquid pressure in the flow line. Said occurrence may for instance, be caused by a pressure surge initiated by a rapid closure of a valve in the flow line during the liquid transfer process. Minor damages of the flow line may reduce the service period of the flow line considerably. A major damage of the flow line may even cause a rupture of the flow line during the liquid transfer process, which may lead to environmental pollution. Furthermore, repair of a part of the flow line which is not readily accessible may require smooth weather conditions and an extensive repair operation causing a long down-time of the system.

SUMMARY OF THE INVENTION

A primary purpose of the invention is to provide a single point mooring system which is protected against the occurrence of an excessively high liquid pressure in the flow line.

Therefore, the single point mooring system according to the invention includes a rotatable mooring element, a flow line for creating a liquid communication between liquid supply facilities and a ship moored to the system, a passage for creating a liquid communication between the flow line and a liquid collecting reservoir, pressure relief means adapted to close the passage during normal operation but to open it when the liquid pressure in the flow line reaches a predetermined critical value, a detector adapted to detect the occurrence of said critical value, a signal transmitter connected to the detector and adapted to transmit a signal to a signal receiver in response to detection by the detector of said occurrence, and flow control means connected to the signal receiver in such a manner that the flow control means will control liquid flow through the flow line in response to the signal received by the signal receiver.

In a preferred embodiment of the invention the pressure relief means includes a bursting disc which is adapted to burst so as to open the passage when the liquid pressure in the flow line reaches the predetermined critical value.

BRIEF DESCRIPTION OF THE DRAWINGS

The assembly and operation of preferred embodiments of the invention will be described in more detail and by way of example with reference to the accompanying drawings wherein.

DESCRIPTION OF PREFERRED EMBODIMENT

Figure 1:
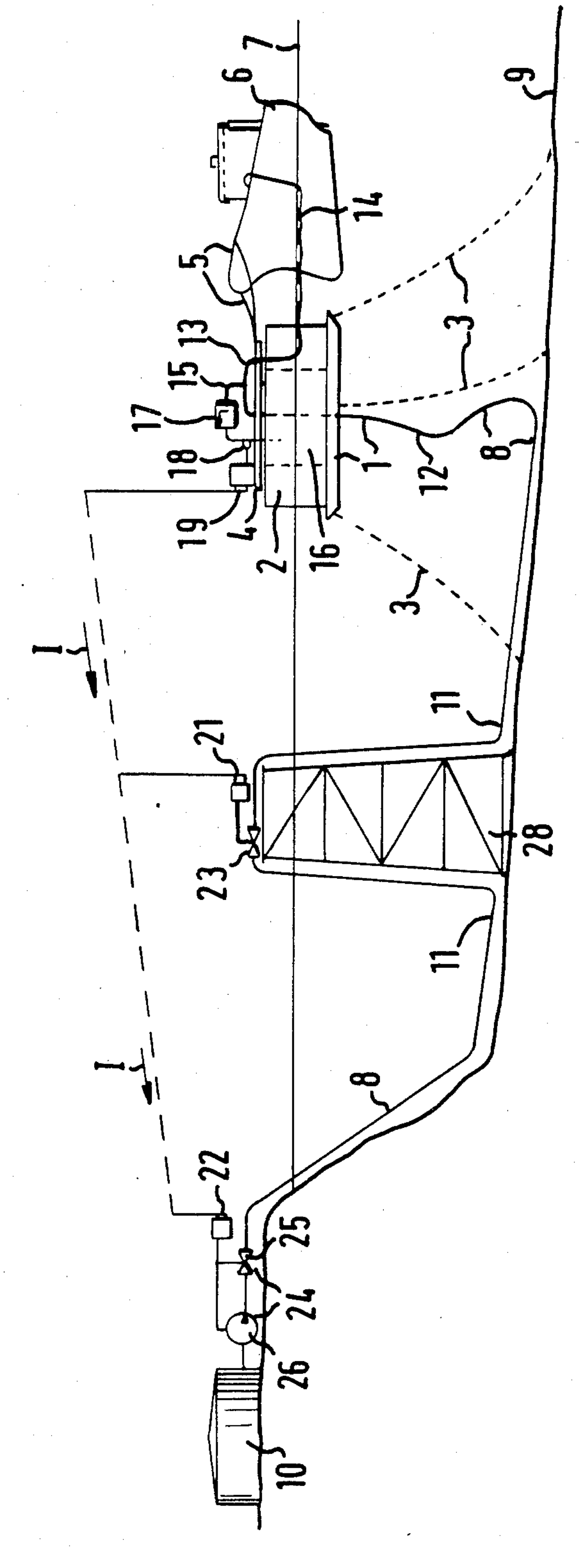
FIG. 1 shows a diagrammatic perspective view of a single point mooring system according to the invention.

In FIG. 1 the single point mooring system is a single buoy mooring system, which is indicated by the reference numeral 1. The single buoy mooring system 1 comprises a buoy 2 floating at the water surface 7 and being anchored to the water bottom 9 by means of anchor lines 3. The buoy 2 is provided with a rotatable mooring element 4. A ship 6 is moored to the rotatable mooring element 4 by means of mooring lines 5, thus allowing the ship to rotate about the buoy 2 in response to forces caused by the tides, winds and currents.

The system 1 further includes a flow line 8 for creating a liquid communication between liquid supply facilities 10 and the ship 6. The flow line 8 is composed of a rigid pipeline 11, a submarine flexible conduit 12, a rotatable pipe section 13 on the buoy 2 and a floating flexible conduit 14 leading to the ship 6.

A passage 15 is arranged on the buoy 2 for creating a liquid communication between the flow line 8 and a liquid collecting reservoir 16, which is arranged in the interior of the buoy 2. The passage 15 is provided with pressure relief means 17, which close the passage 15 during normal operation, but which are adapted to open the passage 15 when the liquid pressure in the flow line 8 reaches a predetermined critical value.

A liquid detector 18 is arranged in the section of the passage 15 between the pressure relief means 17 and the liquid collecting reservoir 16. The liquid detector 18 is connected to a radiographic signal transmitter 19, which is adapted to transmit a radiographic signal indicated by arrows I in response to detection of liquid by the liquid detector 18. Radiographic signal receivers 21 and 22 are respectively connected to flow control means 23 and 24 in such a manner that the flow control means will be able to interrupt liquid flow through the flow line 8 in response to the signal I.

The flow control means 23 is preferably a valve which is adapted to be closed gradually in response to the signal I. The valve 23 is arranged in a section of the flow line 8 which is located above the water level and is supported by a platform structure 28. The other flow control means 24 are arranged onshore and comprise a valve 25 adapted to be closed gradually in response to the signal I and pumping means 26 adapted to interrupt pumping of liquid through the flow line 8 in response to the signal I.

The system 1 operates as follows. During normal loading liquid is pumped through the flow line 8 to the ship 6, and the passage 15 is closed by the pressure relief means 17, so that all liquid flows through the flow line 8 to the ship 6.

Incidentally the liquid pressure in the flow line 8 may rise to an excessively high value, for instance when a pressure surge is initiated in the flow line 8. Such an excessively high liquid pressure may cause damage to the flow line 8 and particularly damage to the relatively fragile flexible conduits 12 and 14.

The pressure relief means 17 prevent the occurrence of an excessively high liquid pressure in the flow line 8. For this purpose the pressure relief means 17 open the passage 15 when the liquid pressure reaches a predetermined critical value, so that liquid will be allowed to flow from the flow line 8 through the passage 15 to the liquid collecting reservoir 16. Owing to the liquid flow through the passage 15 liquid discharge from the flow line 8 increases, causing a decrease of the liquid pressure in the flow line 8 to a value below the critical value.

In case of a pressure surge caused by a sharp deceleration of the liquid flowing through the flow line 8, the additional liquid discharge through the passage 15, after its opening by the pressure relief means 17, will cause a more moderate deceleration of the liquid, thus relieving the pressure surface to a value below the critical value.

Because of the limited volume of the liquid collecting reservoir 16 liquid flow through the passage 15 has to be interrupted before the liquid collecting reservoir 16 is filled entirely with liquid. Consequently, liquid flow through the flow line 8 is interrupted within a predetermined period of time after opening of the passage 15 by the pressure relief means 17, so that no liquid enters the passage 15 after said period of time.

Interruption of liquid flow through the flow line 8 within a predetermined period of time after opening of the passage 15 is achieved as follows. As soon as the pressure relief means 17 have opened the passage 15, liquid flows through the passage 15, which is detected by the liquid detector 18. In response to said detection a signal I is transmitted by the signal transmitter 19 to the signal receivers 21 and 22. In response to the signal I the valves 23 and 25 are closed gradually and the pumping means 26 are stopped, so that liquid flow through the flow line 8 is decelerated gradually until it is interrupted entirely.

After said interruption the process of liquid transfer through the flow line 8 to the ship 6 may be started again after reclosing the pressure relief means 17, emptying the liquid storage reservoir 16, if necessary, reopening the valves 23 and 25 and restarting the pumping means 26.

It will be appreciated that various alternative assemblies of the system 1 are possble. For instance, another passage (not shown) connected to the flow line 8 and provided with pressure relief means (not shown) may be installed on the platform 28, wherein a liquid collecting reservoir (not shown) may be secured to the platform 28. The pressure relief means 17 may comprise a bursting disc or a spring loaded valve or a pressure loaded valve in the passage 15, said valves being adapted to open the passage 15 when the liquid pressure in the flow line 8 reaches the critical value and to reclose the passage 15 automatically when the liquid pressure has been decreased to a value below the critical value.

An advantage of the application of a spring- or pressure-loaded valve being that it is not necessary to interrupt the liquid flow entirely after opening of the passage 15, but a temporarily controlled liquid flow through the flow line 8 at a reduced liquid pressure, which may be achieved by a lower speed of the pumping means 26, will allow the spring- or pressure-loaded valve to reclose the passage 15 automatically.

Instead of a radiographic signal transmitter 19 and radiographic signal receivers 21 and 22 an optical signal transmitter (not shown) and optical signal receivers (not shown) may be installed, or if desired the signal I may be transmitted via a submarine signal transmission cable (not shown).

Figure 2:
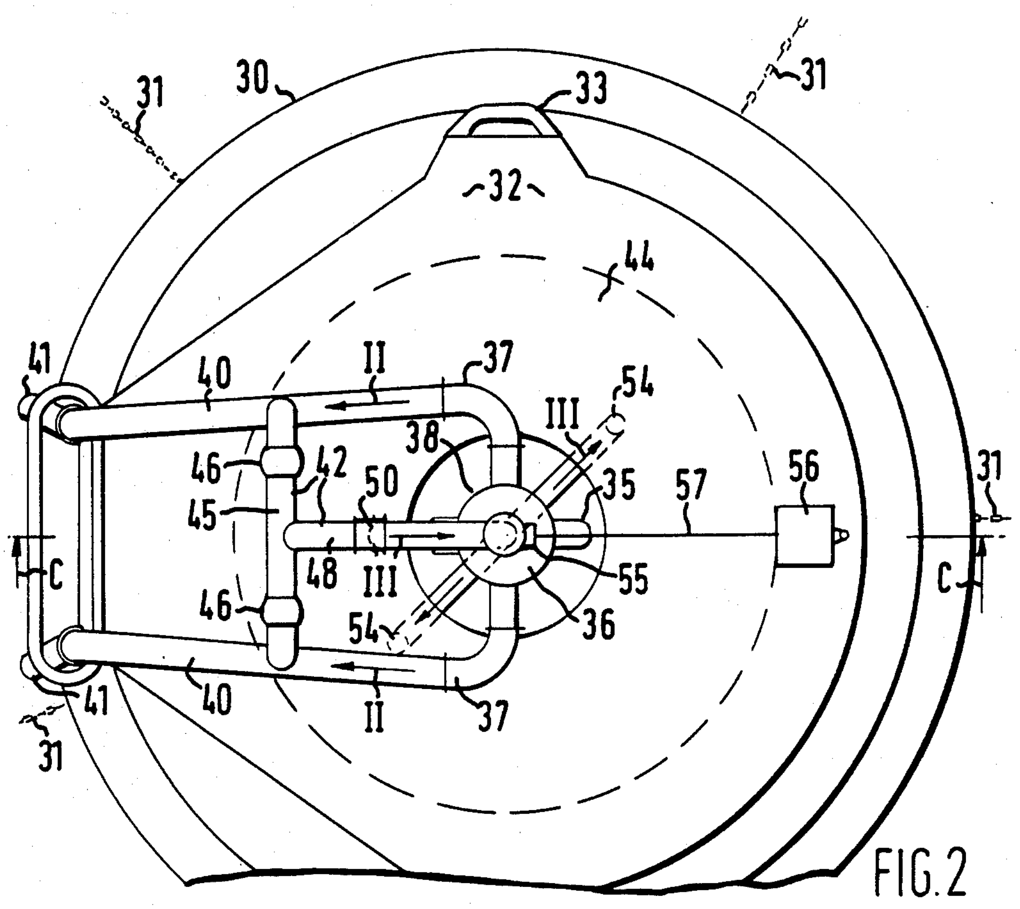
FIG. 2 shows in detail a top plan view of part of a buoy of a single point mooring system according to the invention.
Figure 3:
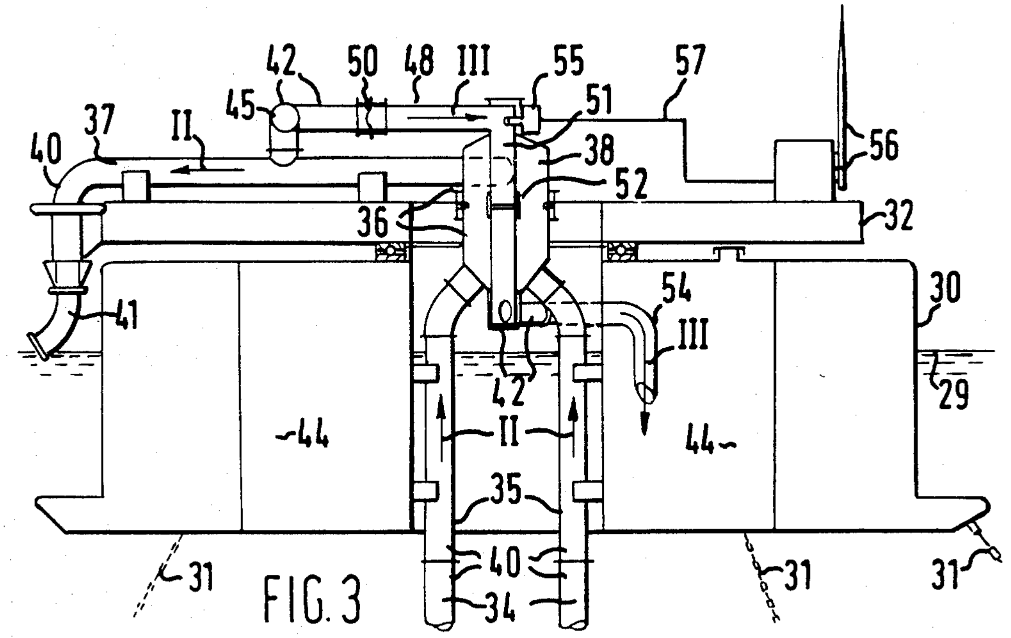
FIG. 3 shows a cross sectional view C—C of the buoy of FIG. 2.

FIGS. 2 and 3 show in detail a buoy 30 which is part of a single point mooring system according to the invention.

The buoy 30 floats at the water surface 29 and is anchored to the water bottom (not shown) by means of anchor lines 31. The buoy 30 is provided with a rotatable mooring element 32 which comprises a mooring lug 33 for the mooring lines (not shown) of a ship (not shown).

A flow line 40 is composed of a submarine pipeline (not shown), two parallel flexible conduits 34, two parallel conduits 35, a pipe swivel 36 and two substantially parallel rotatable pipe sections 37. Each flexible conduit 34 is connected at its lower end to the submarine pipeline (not shown). Each conduit 35 provides a liquid communication between the upper end of a corresponding flexible conduit 34 and the lower end of the pipe swivel 36. The rotatable pipe sections 37 are supported by the rotatable mooring element 32. One end of each pipe section 37 is connected to a rotatable part 38 of the pipe swivel 36 and the other end of each pipe section 37 is provided with rotatable conduit couplings 41 which are adapted to be coupled to floating flexible conduits (not shown) leading to the moored ship (not shown).

A passage 42 is arranged on the buoy 30 for providing a liquid communication between the rotatable pipe sections 37 of the flow line 40 and a ring shaped liquid collecting reservoir 44 which is arranged in a compartment of the buoy 30. The passage 42 is composed of a tangential passage section 45 provided with valves 46, a radial passage section 48, a vertical passage section 51 passing through the pipe swivel 36 and two discharge sections 54.

The axial passage section 48 comprises pressure relief means being constituted by a bursting disc 50, wherein the disc 50 is adapted to burst open when the liquid pressure in the flow line 40 reaches a predetermined critical value. The vertical passage section 51 comprises a swivel 52 and a liquid detector 55.

The liquid detector 55 is adapted to produce an electric signal which can be passed via an electric transmission cable 57 to a radiographic signal transmitter 56 in response to detection of liquid in the vertical passage section 51. The radiographic signal transmitter 56 is adapted to transmit a radiographic signal to a radiographic signal receiver (not shown) in response to the electric signal of the liquid detector 55.

The system shown in FIGS. 2 and 3 operates as follows. During a normal loading operation liquid flows through the flow line 40 as indicated by arrows II and since the axial passage section 48 is closed by the bursting disc 50 liquid flow through the passage 42 to the liquid collecting reservoir 44 is blocked.

When the liquid pressure in the flow line 40 rises to a predetermined critical value, the bursting disc 50 bursts, so as to allow liquid to flow from the flow line 40 through the passage 42 into the liquid collecting reservoir 44 as indicated by arrows III. In response to the liquid discharge through the passage 42 the liquid pressure in the flow line 40 decreases to a value below the critical value.

The liquid flow III through the passage 42 is detected by the liquid detector 55, which produces in response to said detection, an electric signal which is passed via the transmission cable 57 to the radiographic signal transmitter 56. In response to the electric signal of the liquid detector 55 a radiographic signal is transmitted by the radiographic signal transmitter 56 to the radiographic signal receiver (not shown). In response to the signal received by the signal receiver (not shown) flow control means (not shown) interrupt liquid flow through the flow line 40, so as to cause the liquid flow through the passage 42 to be interrupted before the liquid collecting reservoir 44 is filled entirely with liquid.

After said interruption the process of liquid transfer through the flow line 40 may be started again after replacing the burst bursting disc 50 by an unimpaired bursting disc and if necessary after emptying the liquid collecting reservoir 44.

An important advantage of the arrangement of the bursting disc 50, the liquid detector 55 and the radiographic signal transmitter 56 on the buoy 30 is that an accurate and reliable pressure relief system is created close to the relatively fragile flexible conduits 34, wherein the pressure relief system requires only a very limited quantity of energy, so that the required energy may be provided by batteries (not shown) on the buoy 30.

It will be understood that the pressure relief means 50 will also open the passage 42 when the liquid pressure in the flow line 40 reaches a predetermined critical value during an unloading operation of a ship (not shown), wherein liquid flows through the flow line 40 in a direction opposite to the direction indicated by the arrows II. It will be appreciated that in order to interrupt liquid flow through the flow line 40 after said opening of the passage 42 flow control means (not shown) adapted to interrupt liquid flow through the flow line 40 in response to the signal of the signal transmitter 56 are in that case arranged on the ship (not shown) moored to the buoy 30.

What is claimed is:

1. A single point mooring system for loading and unloading ships comprising a rotatable mooring element, a flow line for establishing liquid communication between liquid supply facilities and a ship moored to the rotatable mooring element, a passage for establishing liquid communication between the flow line and a liquid collecting reservoir on the rotatable mooring element, pressure relief means adapted to open the passage when the liquid pressure in the flow line reaches a predetermined critical value, a detector in the passage adapted to detect the occurrence of liquid in the passage, a signal transmitter connected to the detector and adapted to transmit a signal to a signal receiver in response to detection by the detector of said occurrence, and flow control means connected to the signal receiver and operative to control liquid flow through the flow line in response to the signal received by the signal receiver.

2. The system of claim 1 wherein the pressure relief means comprises a bursting disc which is adapted to burst so as to open the passage when the liquid pressure in the flow line reaches the predetermined critical value.

3. The system of claim 1 wherein the detector is a liquid detector arranged in the passage downstream of the pressure relief means.

4. The system of claim 1 wherein the detector is a liquid detector arranged in the liquid collecting reservoir.

5. The system of claim 1 wherein the signal transmitter and receiver are radiographic.

6. The system of claim 1 wherein the flow control means comprises a value which is arranged in the flow line extending between the liquid supply facilities and the passage.

7. The system of claim 7 wherein the value is in the flow line being supported by a platform structure.

8. The system of claim 1 wherein the flow control means comprises pumping means for pumping liquid through the flow line, the pumping means being adapted to interrupt pumping in response to the signal received by the signal receiver.

9. The system of claim 1 wherein the flow line attached to the buoy and the liquid collecting reservoir are arranged on or in the buoy.

10. The system of claim 10 wherein the passage, the pressure relief means, the detector and the signal transmitter are arranged on the buoy.

* * * * *